US008557438B2

(12) United States Patent
Johnson et al.

(10) Patent No.: US 8,557,438 B2
(45) Date of Patent: Oct. 15, 2013

(54) ELECTRODE MATERIALS FOR RECHARGEABLE BATTERY

(75) Inventors: Christopher Johnson, Naperville, IL (US); Sun-Ho Kang, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 436 days.

(21) Appl. No.: 12/868,470

(22) Filed: Aug. 25, 2010

(65) Prior Publication Data
US 2012/0052375 A1 Mar. 1, 2012

(51) Int. Cl.
| H01M 4/13 | (2010.01) |
| H01M 4/00 | (2006.01) |
| H01M 4/58 | (2010.01) |
| H01M 6/04 | (2006.01) |
| H01M 10/26 | (2006.01) |

(52) U.S. Cl.
USPC ........ 429/224; 429/223; 429/231.6; 429/221; 429/231.5; 429/206; 252/518.1; 252/521.2; 252/520.2

(58) Field of Classification Search
USPC ............. 429/209–246; 252/521.2, 520.22, 252/520.2; 423/594.15, 641, 594.3, 599, 423/594.1, 600, 598
See application file for complete search history.

(56) References Cited

U.S. PATENT DOCUMENTS

| 6,376,123 | B1 | 4/2002 | Chu |
| 6,960,335 | B1* | 11/2005 | Singhal et al. ............... 423/599 |
| 7,303,840 | B2 | 12/2007 | Thackeray et al. |
| 7,314,684 | B2 | 1/2008 | Kang et al. |
| 7,695,868 | B2 | 4/2010 | Inoue et al. |
| 2006/0239883 | A1 | 10/2006 | Kang et al. |
| 2007/0218361 | A1* | 9/2007 | Inoue et al. ............... 429/231.1 |
| 2009/0123842 | A1 | 5/2009 | Thackeray et al. |

OTHER PUBLICATIONS

Paulsen, J.M. et al., O2 structure Li2/3[Ni 1/3 Mn 2/3]O2: A New layered cathode material for rechargeable lithium batteries, J. Electrochemical Society vol. 147 (2000) 861-868.*

Johnson, C.S. et al., Layered (1-x)Li2MnO3•x LiMO2(M=Ni,Co,Cr,or Mn) Electrodes for Lithium Batteries, Electrochemical Society Proceedings, vol. 2000-36 (2001) 47-60.

Johnson, C.S. et al., The Significance of the Li2MnO3 Component in Composite xLi2MnO3 • (1-x)LiMn0.5Ni0.5O2 Electrodes, Electrochemistry Communications, vol. 6 (2004) 1085-1091.

(Continued)

Primary Examiner — Patrick Ryan
Assistant Examiner — Kiran Quraishi
(74) Attorney, Agent, or Firm — Olson & Cepuritis, Ltd.

(57) ABSTRACT

A positive electrode is disclosed for a non-aqueous electrolyte lithium rechargeable cell or battery. The electrode comprises a lithium containing material of the formula $Na_yLi_xNi_zMn_{1-z-z'}M_{z'}O_d$, wherein M is a metal cation, $x+y>1$, $0<z<0.5$, $0 \leq z'<0.5$, $y+x+1$ is less than d, and the value of d depends on the proportions and average oxidation states of the metallic elements, Li, Na, Mn, Ni, and M, if present, such that the combined positive charge of the metallic elements is balanced by the number of oxygen anions, d. The inventive material preferably has a spinel or spinel-like component in its structure. The value of y preferably is less than about 0.2, and M comprises one or more metal cations selected preferably from one or more monovalent, divalent, trivalent or tetravalent cations, such as $Mg^{2+}$, $Co^{2+}$, $Co^{3+}$, $B^{3+}$, $Ga^{3+}$, $Fe^{2+}$, $Fe^{3+}$, $Al^{3+}$, and $Ti^{4+}$. The electrode material can be synthesized using an ion-exchange reaction with a lithium salt in an organic-based solvent to partially replace sodium ions of a precursor material with lithium ions.

8 Claims, 10 Drawing Sheets

SEM precursor - $Na_{1.0}Li_{0.2}Ni_{0.25}Mn_{0.75}O_d$,

SEM ion-exchanged product - $Na_{0.02}Li_{1.0}Ni_{0.25}Mn_{0.75}O_d$

(56) References Cited

OTHER PUBLICATIONS

Thackeray, Michael et al., Li2MnO3-stabilized LiMO2(M=Mn,Ni,Co) Electrodes for Lithium-Ion Batteries, Journal of Materials Chemistry, vol. 17 (2007) 3112-3125.

Johnson, C.S. et al., Lithium-Manganese Oxide Electrodes with Layered-Spinel Composite Structures xLi2MnO3 . . . Electrochemistry Communications, vol. 7 (2005) 528-536.

Park, S.H. et al., Lithium-Manganese-Nickel-Oxide Electrodes with Integrated Layered Spinel Structures . . . Electrochemistry Communications, vol. 9 (2007) 262-268.

Cabana, J. et al. Structural and Electrochemical Characterization of Composite Layered Spinel Electrodes . . . Journal of the Electrochemical Society. 156 vol. 9 (2009) A730-A736.

Kang, Kisuk et al. Electrodes with High Power and High Capacity for Rechargeable Lithium Batteries, Science, vol. 311 (2006) 977-980.

Armstrong, A.R. et al., Synthesis of Layered LiMnO2 as an Electrode for Rechargeable Lithium Batteries, Nature, vol. 381 (1996) 499-500.

Capitaine F. et al., A New Variety of LiMnO2 With a Layered Structure, Solid State Ionics, vol. 89 (1996) 197-202.

Quine T.E., et al., Layered LixMn1-yNiyO2 Intercalation Electrodes, Journal of Materials Chemistry, vol. 10 (2000) 2838-2841.

Paulsen, J.M. et al., Studies of the Layered Manganese Bronzes . . . Solid State Ionics, vol. 126 (1999) 3-24.

Eriksson T.A. et al., Influence of Substitution on the Structure and Electrochemistry of Layered Manganese Oxides, Chem. Mater. vol. 15 (2003) 4456-4463.

Robertson, A.D. et al., Nonstoichiometric Layered LixMnyO2 Intercalation Electrodes—A Multiple Dopant Strategy, Journal of Materials Chemistry vol. 13 (2003) 2367-2373.

* cited by examiner

SEM precursor - $Na_{1.0}Li_{0.2}Ni_{0.25}Mn_{0.75}O_d$,

SEM ion-exchanged product - $Na_{0.02}Li_{1.0}Ni_{0.25}Mn_{0.75}O_d$

Before ion exchange

After ion exchange

Before ion exchange

After ion exchange

ELECTRODE MATERIALS FOR RECHARGEABLE BATTERY

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to energy storage devices, notably non-aqueous electrochemical cells and batteries and, more particularly, non-aqueous rechargeable lithium electrochemical cells and batteries. Rechargeable lithium cells and batteries are widely used for energy storage in a number of consumer, medical, aerospace, and defense applications, and are emerging as an important factor for transportation technologies.

BACKGROUND

The need for energy storage and its rising demand has become a major issue that the world faces today and going forward in the future. For transportation applications, the implementation of Li-ion batteries in Plug-In Hybrid Electric Vehicles (PHEV) and eventually Electric Vehicles (EV) is quickly emerging. The specific energy and power of Li-ion batteries continues to grow as high-performance anode and cathode materials become commercially available. Recent advances in cathode materials have resulted from blending the materials such as layered $LiNi_{0.8}Co_{0.15}Al_{0.05}O_2$ (NCA) and spinel $LiMn_2O_4$ phases to create bi-functional behavior: high-rate (spinel) and high-energy (NCA) capabilities. These two advantageous properties are contained in one electrode. However, one would prefer a sole material that can intrinsically provide both high-rate and high-energy.

In 2000/2001, Johnson and Thackeray [1] first published in Proceedings of the International Workshop on Electrochemical Systems, The Electrochemical Society, PV 2000-36, 47-60 (2001) a new 'layered-layered' composite material that contained $Li_2MnO_3$ with $LiNi_{0.8}Co_{0.2}O_2$ that was integrated together and implemented as a new class of cathode materials that featured acceptable capacity and good stability. Later the 'inactive' $Li_2MnO_3$ was electrochemically activated at voltages above about 4.5 V, leading to a $MnO_2$ layered phase that was integrated in the structure [2]. Subsequent materials featured Mn and Ni-rich compositions with extra lithium [3]. This process dramatically increased the reversible capacity above about 220 mAh/g. Later work included electrodes designed with 'layered-spinel' structures [4].

In an attempt to provide a material with bi-functional behavior, Park et al. [5] synthesized a series of $xLi[Mn_{1.5}Ni_{0.5}]O_4 \cdot (1-x)\{Li_2MnO_3 \cdot Li(Ni_{0.5}Mn_{0.5})O_2\}$ structurally integrated 'layered-layered-spinel' composites, where x was varied from 0 to 1 [5]. These Ni(II)- and Mn(IV)-containing materials achieved high-capacities of 250 mAh/g, due to electrochemical activation of the $Li_2MnO_3$ component and high rate capability (200 mAh/g; C/1 rate) due to the Ni-containing layered and spinel components. The ordering of Ni/Mn within the structure was elucidated by Cabana et al. using Li-6 MAS NMR, and high-intensity X-ray diffraction [6].

In regards to layered-only type materials, Kang et al. [7] demonstrated that layered oxide cathodes can yield a very high-capacity of 183 mAh/g at a 6 C rate from an active $Li(Ni_{0.5}Mn_{0.5})O_2$ material synthesized by lithium ion-exchange from the $Na(Ni_{0.5}Mn_{0.5})O_2$ precursor made from the co-precipitated $Ni_{0.5}Mn_{0.5}(OH)_2$ starting material. The size mismatch in cationic radii of the Na (1.02 Å) versus $Ni^{2+}$ (0.69 Å) resulted in less anti-site disorder in the precursor that carried over to the Li-exchanged product. The final reaction to form a Li-containing material was by an ion-exchange reaction with LiBr in hexanol, a method introduced earlier by Armstrong et al. [8] and Capitaine et al. [9] from sodium compounds in their synthesis of layered $LiMnO_2$, and variants thereof [10,11].

Roughly ten years ago, Paulsen and Dahn [12] reported on lithium deficient cathode materials of typical composition $Li_{2/3}(Ni_{1/3}Mn_{2/3})O_2$ in Solid State Ionics Vol. 126, 3 (1999). These types of materials were made from Li-ion exchange of the starting material layered sodium bronze analogs, which is similar to that used in the present invention. Such materials and variants of these materials where the Ni/Mn ratio was altered or Co was added were also synthesized, characterized and evaluated in lithium cells. The sodium bronzes starting materials were synthesized from single metal hydroxides, oxides and carbonates. However, there was no data in the publication on the addition of extra lithium to the sodium layered bronze that was synthesized as the precursor.

The Paulsen and Dahn work was extended by Eriksson, et al. [13] in Chemistry of Materials, Vol. 15, 4456 (2003) to include compositions $Na_{0.7}MnO_2$ or $Na_{0.7}Mn_{0.89}M_{0.11}O_2$, (where M=Fe, Co, Ni, Cu, Zn, Li, or Al). The sodium starting materials were made by the glycine nitrate process from individual metal nitrates. The sodium reactants were subsequently ion-exchanged with lithium in an organic solvent with lithium bromide. Lithium cells were tested using the Li-ion exchanged compositions as the electroactive material. Using their terminology of O2 and O3, it was concluded that the structure of the Li-exchanged final product was an O2 structure or an intergrowth of O2/O3 with stacking faults. The structure type was dictated by the type of M cation substituted. The electrochemical discharge voltage profile showed one continuous sloping profile and no indication of a phase change to spinel were observed.

SUMMARY OF THE INVENTION

This invention relates to lithium transition metal-oxide electrodes that contain sodium for use in lithium cells and batteries. More specifically, the invention relates to an electrode with composition $Na_yLi_xNi_zMn_{(1-z-z')}M_{z'}O_d$, where $x+y>1$, $0 \leq z' < 0.5$, $0 \leq z' < 0.5$, and $y+x+1$ is less than d. The value of d depends on the proportions and average oxidation states of the metallic elements in the composition (Li, Na, Mn, Ni, and M) such that the combined positive charge of the metallic elements is balanced by the oxygen anions. The electrode contains a spinel or spinel-type (disordered or defect) component in the structure. Typically, y is less than 0.1, and preferably, y is less than 0.2. M, if present, is one or more metal cation selected preferably from one or more monovalent, divalent, trivalent or tetravalent cations, examples of which are $Mg^{2+}$, $Co^{2+}$, $Co^{3+}$, $B^{3+}$, $Ga^{3+}$, $Fe^{2+}$, $Fe^{3+}$, $Al^{3-}$, and $Ti^{4+}$. The principles of this invention extend to include a ion-exchange method/post-treatment used to create said $Na_yLi_xNi_zMn_{(1-z-z')}M_{z'}O_d$ electrode. The ion-exchange method consists of treating a precursor material with excess lithium salt in an organic solvent, the precursor material comprising $Na_{y'}Li_{x'}Ni_zMn_{(1-z-z')}M_{z'}O_{d'}$, wherein $y'+x'>1$ (d' typically is about 2.35) having a layered structure similar to $Na_{0.7}MnO_{2+e}$ (e=about 0.05, Joint Committee on Powder Diffraction Standards (JCPDS) card #27-0751). The electrodes of this invention can be used in rechargeable lithium cells and batteries.

A lithium containing material suitable for use in the electrodes of the present invention can be prepared, for example, by first pyrolyzing a mixture of powdered carbonates comprising $Na_2CO_3$, $Li_2CO_3$ and $(Ni,Mn,M)CO_3$ or $(Ni,Mn)CO_3$ and $MCO_3$; wherein M comprises one or more metal cation to make the precursor material, followed by ion exchange to replace some of the sodium ions with lithium ions. Preferably, the pyrolysis is carried out by heating the mixture at a temperature in excess of about 500° C.

One preferred process of preparing the lithium containing material involves exchanging lithium ions for sodium ions in a precursor composition of formula $Na_{y'}Li_{x'}Ni_zMn_{1-z-z'}M_{z'}O_{d'}$ wherein M is a metal cation, $x'+y'<1$, $0<z<0.5$, $0 \le z'<0.5$, $y'+x'+1$ is less than $d'$, and the value of $d'$ depends on the proportions and average oxidation states of the metallic elements, Li, Na, Mn, Ni, and M, if present, such that the combined positive charge of the metallic elements is balanced by the number of oxygen anions, $d'$. The exchange of sodium ions by lithium ions is accomplished by reacting a mixture of the precursor composition with a lithium salt dissolved in an organic solvent, the precursor composition and the resulting exchanged lithium containing material being insoluble in the organic solvent. A preferred lithium salt is lithium bromide and a preferred organic solvent is hexanol. The materials may be refluxed in the organic solvent to facilitate the ion exchange. Optionally, the materials may be stirred at room-temperature following the refluxing step. Preferably, the exchanged lithium containing material is isolated by filtration and optionally washing the filtered material with an alcohol (e.g., hexanol or methanol), followed by drying the material at room temperature.

In some preferred embodiments, the lithium containing materials in the positive electrodes of the invention exhibit a strong layered peak reflection and small Li—Ni—Mn ordering peaks in the range of about 20-25° 2θ (CuKα). The lithium containing material may have a morphology that comprises primary globule particles having a size in the range of about 5 to 100 nm, and secondary particles having a size in the range of about 2 μm to about 20 μm.

An electrochemical cell of the present invention comprises an electrode of the invention as a cathode, in combination with an anode, and a lithium-containing electrolyte therebetween. In some preferred embodiments, the electrochemical cell exhibits a first charge voltage plateau at about 4.4 to 4.5 V, sloping up to about 4.8 V versus Li metal. Preferably, the electrochemical cell exhibits a small irreversible capacity on a first cycle. A freshly prepared electrochemical cell of the invention preferably exhibits a voltage plateau of about 2.7 to about 2.8 V upon the first discharge indicating a spinel component in the structure.

BRIEF DESCRIPTION OF THE DRAWINGS

The invention consists of certain novel features and a combination of parts hereinafter fully described, illustrated in the accompanying drawings, it being understood that various changes in the details may be made without departing from the spirit, or sacrificing any of the advantages of the present invention.

DETAILED DESCRIPTION OF THE PREFERRED EMBODIMENTS

Figure 1:
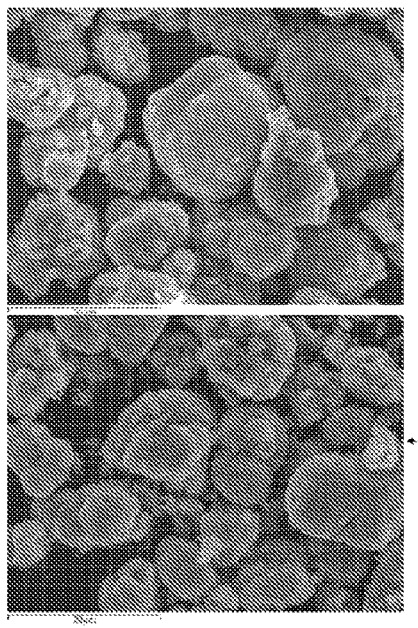
FIG. 1 depicts the (a) SEM of precursor sodium layered transition-metal oxide compound: $Na_{1.0}Li_{0.2}Ni_{0.25}Mn_{0.75}O_{d'}$, (b) SEM of Li-ion exchanged product $Na_yLi_xNi_{0.25}Mn_{0.75}O_d$. Primary particle sizes range about 5 nm to 500 nm in size; secondary particle sizes from about 2 μm to about 20 μm in size.

This invention relates to lithium transition metal-oxide electrodes that contain sodium for use in lithium cells and batteries. More specifically, the invention relates to an electrode with composition $Na_yLi_xNi_zMn_{(1-z-z')}M_zO_d$, where $x+y>1$, $0<z<0.5$, $0 \le z'<0.5$, and $y+x+1$ is less than d. Typically y is less than 0.1, and preferably, y is less than 0.2. The electrode contains a spinel or spinel-type (disordered or defect) component in the structure. M, if present, is one or more metal cations selected preferably from one or more monovalent, divalent, trivalent or tetravalent cations, examples of which are $Mg^{2+}$, $Co^{2+}$, $Co^{3+}$, $B^{3+}$, $Ga^{3+}$, $Fe^{2+}$, $Fe^{3+}$, $Al^{3+}$, and $Ti^{4+}$. The value of d is greater than 2 and less than or equal to 3 (typically about 2.4). The value of d depends on the proportions and average oxidation states of the metallic elements in the composition (Li, Na, Mn, Ni, and M) such that the combined positive charge of the metallic elements is balanced by the oxygen anions. The principles of this invention extend to include an ion-exchange method to synthesize said $Na_yLi_xNi_zMn_{(1-z-z')}M_zO_d$ electrode. The ion-exchange method consists of treating a precursor composition with at least a 2-fold mole excess lithium salt in organic solvent. The precursor composition comprises $Na_{y'}Li_{x'}Ni_zMn_{1-z-z'}M_{z'}O_{d'}$ wherein M is a metal cation, $x'+y'>1$, $0<z<0.5$, $0 \le z'<0.5$, y'+x'+1 is less than d', and the value of d' depends on the proportions and average oxidation states of the metallic elements, Li, Na, Mn, Ni, and M, if present, such that the combined positive charge of the metallic elements is balanced by the number of oxygen anions, d'. The precursor material preferably has a similar layered structure to layered $Na_{0.7}MnO_{2+e}$ (e=about 0.05, Joint Committee on Powder Diffraction Standards (JCPDS) card #27-0751). In some preferred embodiments, the lithium salt is lithium bromide and the organic solvent is hexanol. Preferably, the lithium-containing product is isolated by filtration and optionally washing with a solvent such as an alcohol (e.g., hexanol or methanol) to remove any soluble salts that may remain in the material. Typically, the product is dried at room-temperature, e.g., for about 2-3 days. The electrodes of this invention can be used in rechargeable lithium cells and batteries.

High-capacity cathode materials with high-rate have been synthesized for use in rechargeable batteries, specifically lithium cells and batteries. Typically, high-energy/capacity cells suffer from a high percentage irreversible capacity loss on the first cycle, capacity degradation during multiple cycles and low rate. The present invention targets these shortcomings and offers excellent high rate discharging without specialized coatings for demanding power applications. Prior art electrodes have attempted to overcome these deficiencies by implementing high-Li containing Mn and Ni based material as composites. In these composite 'layered-layered' or 'layered-spinel' electrodes, all the available lithium can be extracted out of the cell at above 4.5 V, which leads to high-capacities. However, these composite cathode materials release oxygen on the first cycle causing an irreversible condensation of the structure, a high-percentage of irreversible capacity loss on the first charge, and degradation of the electrode-electrolyte interface that leaves the residual material with a poor rate capability. In particular, the release of oxygen must be taken into consideration when the rechargeable cells are initially formed. Specialized coatings have also been used to thwart the power loss problems at the electrode interface, but this adds an extra processing step. All of these factors are undesirable for a rechargeable electrode material.

The present invention makes use of a mixed sodium/lithium transition metal oxide in the composition. The sodium/lithium transition-metal oxide precursor is ion-exchanged with lithium, but some residual sodium is left in the electrode composition with lithium. In addition, the mixed sodium/lithium transition metal oxide can be used in a rechargeable lithium-ion cell and battery. The ion-exchanged material addresses the above problems in a lithium cell because typical examples exhibit a low irreversible capacity loss, typically <10% on the first cycle, (2) a high-capacity of about 220 mAh/g (4.8 to 2.0 V), and (3) high-rate capability of about 150 mAh/g (about 1500 mA/g).

Lithium-ion batteries that have been commercialized may contain a number of 4 V cathode materials such as oxides of $LiCoO_2$ (LCO), $LiNi_{0.8}Co_{0.15}Al_{0.05}O_2$ (NCA), $LiNi_{1/3}Mn_{1/3}Co_{1/3}O_2$ (NMC) with layered structures, and spinel or substituted spinels of $LiMn_2O_4$. In addition, olivines are used such as $LiFePO_4$, which is a lower voltage material at 3.5 V, but provides more safety margin versus that of the oxide cathodes, which themselves can release oxygen at high states of charge or during abuse conditions. These cathodes are combined with an anode such as carbon, or graphite, or intermetallics and/or Si and other anodes with a non-aqueous electrolyte to form the full cell. In short, various cathode and anode chemistry and materials for lithium-ion batteries are used in various communication, transportation, medical, aerospace, and defense industries based on the application needs.

Figure 2:
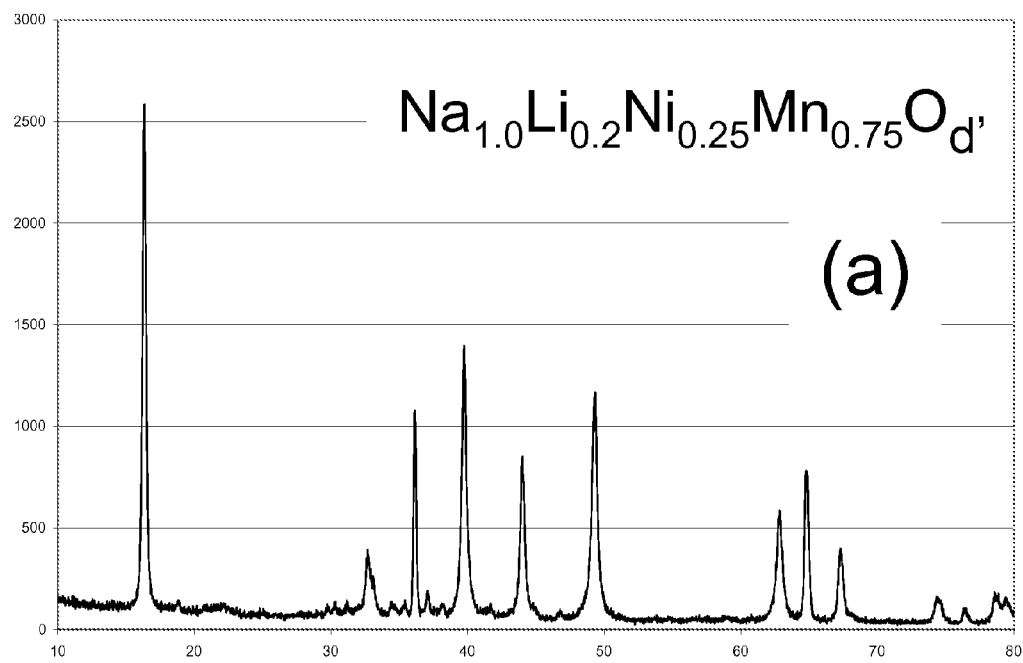
FIG. 2 depicts the X-ray diffraction patterns of (a) $Na_{1.0}Li_{0.2}Ni_{0.25}Mn_{0.75}O_{d'}$ layered precursor, (b) $Na_{1.1}Li_{0.1}Ni_{0.25}Mn_{0.75}O_{d'}$ layered precursor, and (c) $Na_{1.2}Ni_{0.25}Mn_{0.75}O_{d'}$ layered precursor and (d) the ion exchanged $Na_yLi_xNi_{0.25}Mn_{0.75}O_d$ product from sample (a), and (e) the ion exchanged $Na_yLi_xNi_{0.25}Mn_{0.75}O_d$ product from sample (b), and (f) the ion exchanged $Na_yLi_xNi_{0.25}Mn_{0.75}O_d$ product from sample (c); the layering peak is shown in (d), (e), and (f); the Li—Mn—Ni ordering peaks at about 20-25° 2θ (CuKα) are present.
Figure 2:
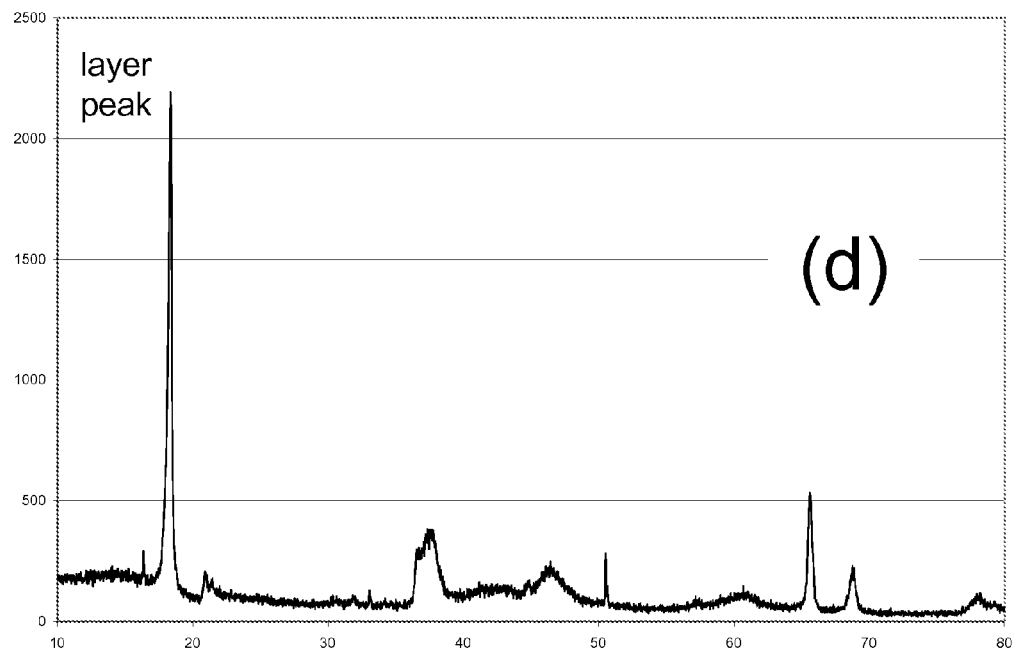
Figure 2:
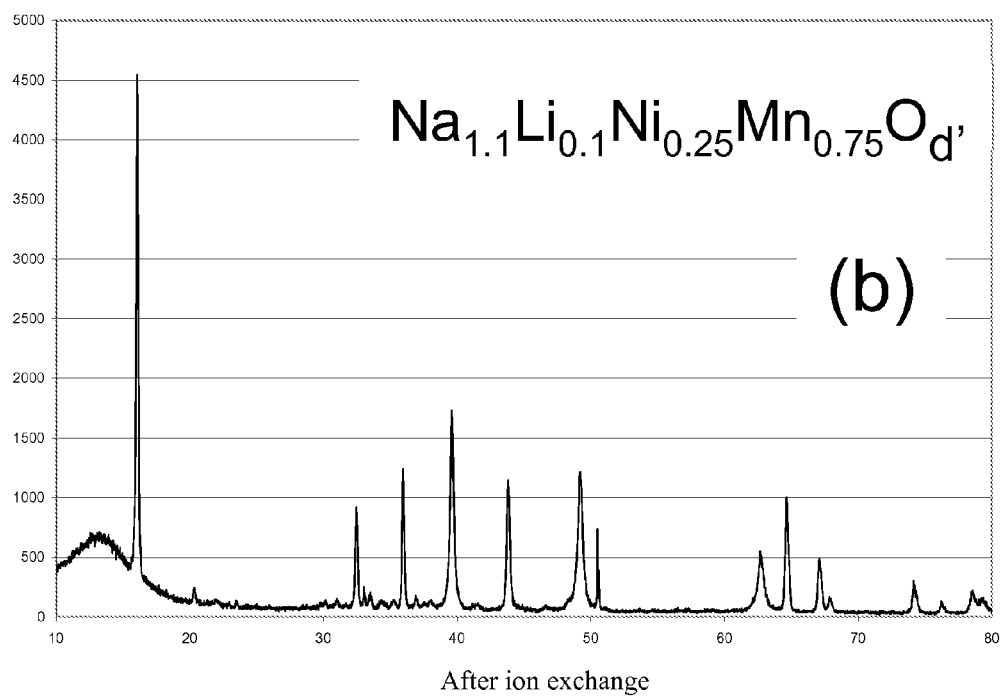
Figure 2:
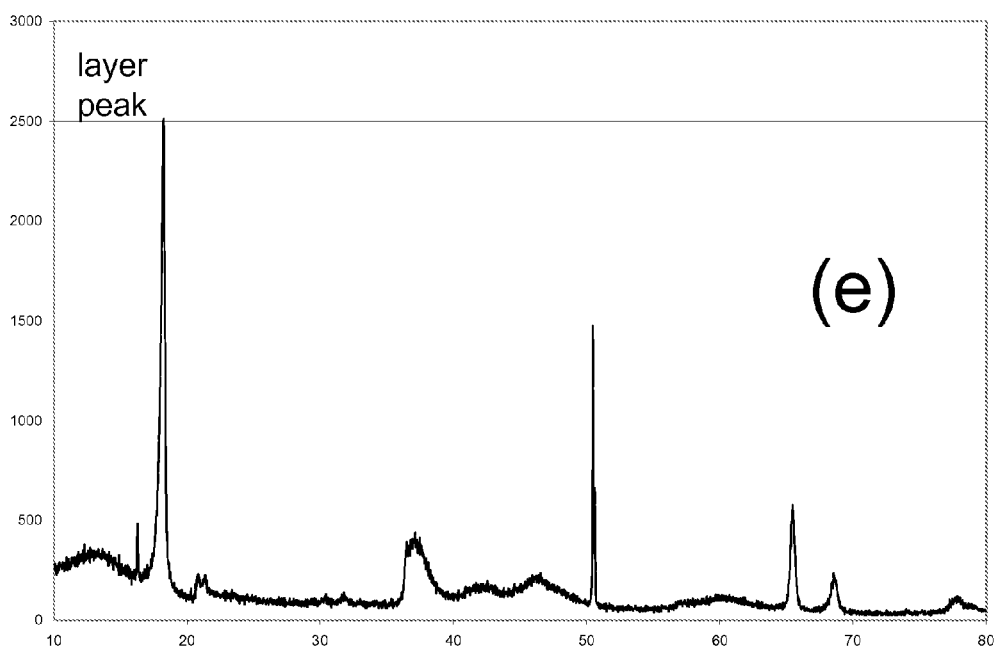
Figure 2:
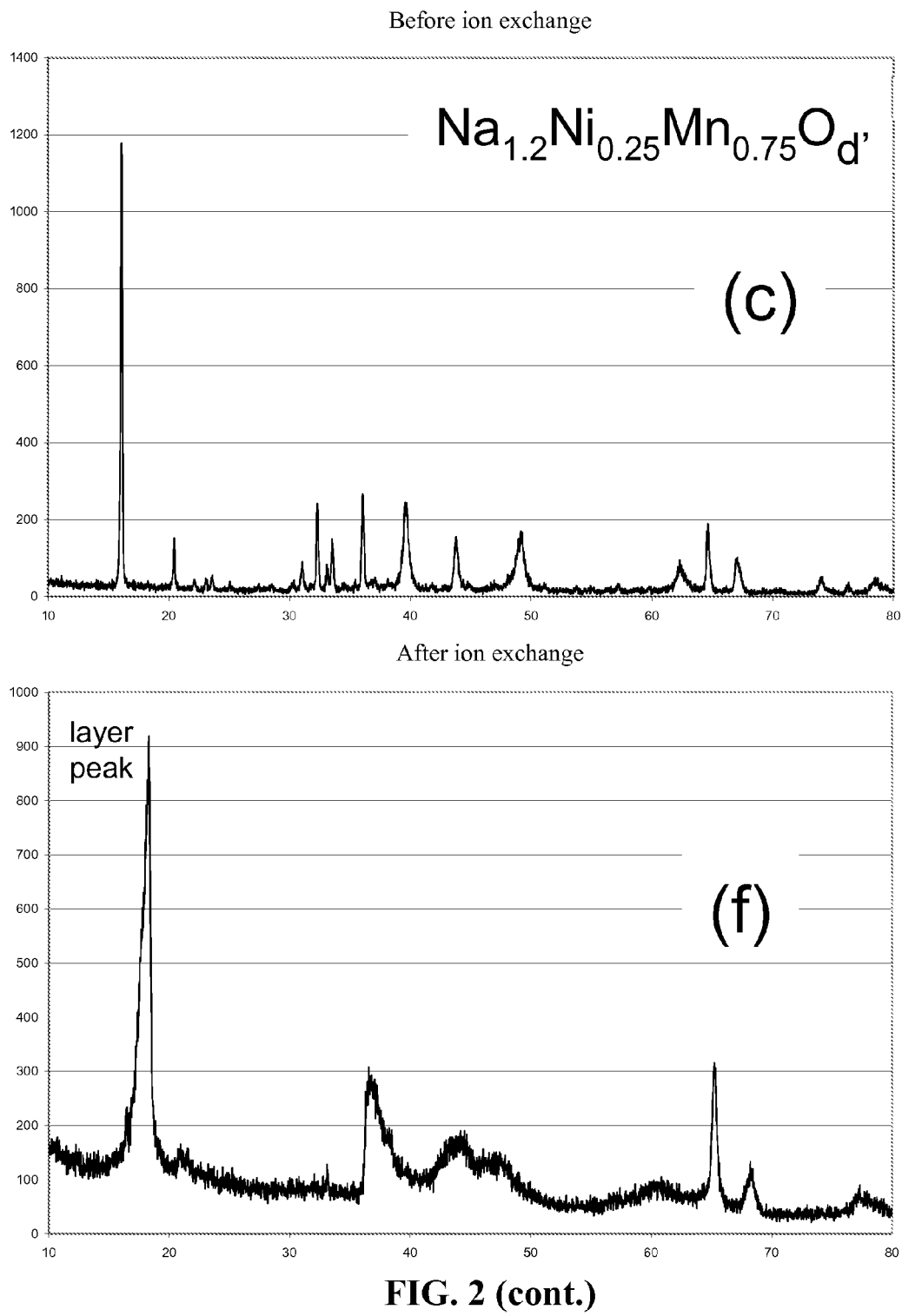

In this invention, a mixed-Na/Li precursor may be synthesized by pyrolysis of a mixture of materials comprising a source of oxygen anions and heat decomposable compounds (e.g., carbonates and hydroxides) of Li, Na, Ni, Mn and optionally M, when M is desired to be present. The oxygen anions preferably are supplied by the heat decomposable compounds. In a preferred embodiment, the mixture of heat decomposable compounds comprises carbonates, such as $Na_2CO_3$, $Li_2CO_3$ and $(Ni,Mn,M)CO_3$ or $(Ni,Mn)CO_3$ and $MCO_3$ in the appropriate metal stoichiometric ratios. Alternatively, the hydroxides of the above metals can replace carbonates, in whole or in part. For example, $Na_2CO_3$ and $LiOH-H_2O$ and the transition metal carbonates or transition metal hydroxides $(Ni,Mn)(OH)_w$ (where w is close to 2) are used instead. In a preferred embodiment, the starting materials for the precursor material are mixed on a slow rotation mixer. The time of mixing is preferably about 16-20 hours, and subsequently the mixed powders are lightly ground in a mortar and pestle. The mixed powder is then fired in air to form the final precursor material composition $Na_{y'}Li_{x'}Ni_{z'}Mn_{(1-z-z')}M_{z'}O_{d'}$. The firing step preferably is first done at about 500° C. for about 8-12 hours then at about 800° C. for about 8-12 hours, with, preferably, a repeated firing at about 800° C. for about 8-12 hours. The precursor is then formed, which has a morphology that consists of primary globules or particles of about 5 nm to 500 nm in size as shown in FIG. 1. The secondary particles are about 2 µm to 20 µm in size. The precursor material has a layered structure, similar to $Na_{0.7}MnO_{2+e}$ (e=about 0.05, Joint Committee on Powder Diffraction Standards (JCPDS) card #27-0751), which is a compound that is layered with sodium cations in the prismatic coordination between the close-packed stacked oxygen anions layers. X-ray powder diffraction patterns are shown in FIG. 2, trace (a). It has the stoichiometry of $Na_{1.0}Li_{0.2}Ni_{0.25}Mn_{0.75}O_{d'}$. FIG. 2 trace (b) and trace (c), have the stoichiometry $Na_{1.1}Li_{0.1}Ni_{0.25}Mn_{0.75}O_{d'}$, and $Na_{1.2}Ni_{0.25}Mn_{0.75}O_{d'}$ (x'=0), respectively. Because of the ionic radii size mismatch of Na cations (1.02 Å) versus $Ni^{2+}$ cations (0.69 Å) and Li cations (0.76 Å), the Li fills octahedral sites in the precursor transition metal (TM) layer. The layered precursor phase was subsequently ion-exchanged with Li.

The ion-exchange process is conducted in an organic solvent such as hexanol, and the lithium salt is present in excess such as lithium bromide. Accordingly, any lithium salt that dissolves in an organic solvent can be used. For example, lithium bromide dissolves in an organic solvent, such as hexanol. In contrast, the Na-rich layered precursor phase is insoluble in the organic solvent and just simply stirs with the organic solvent and dissolved lithium salt. To drive the ion-exchange reaction, the organic solvent preferably is refluxed for a prescribed amount of time. The amount of time is preferably about 4 to 5 hours. After refluxing is terminated, the product is vacuum-filtered and washed with an organic solvent, preferably methanol in order to remove sodium-halide impurities, such as sodium bromide. One preferred synthetic route is shown in the Scheme 1, which illustrates preparation of an electrode material of the invention via a two step process.

Scheme 1

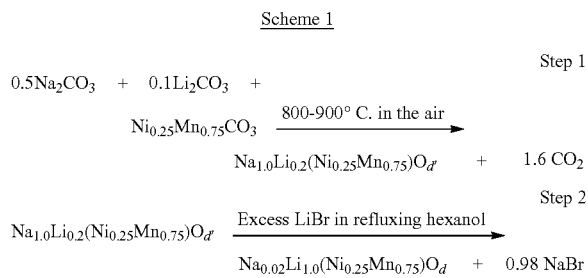

The $Na_{1.0}Li_{0.2}(Ni_{0.25}Mn_{0.75})O_{d'}$ can be converted to $Na_{0.02}Li_{1.0}(Ni_{0.25}Mn_{0.75})O_d$ upon ion-exchange, $Na_{1.1}Li_{0.1}Ni_{0.25}Mn_{0.75}O_{d'}$ can be converted to $Na_{0.04}Li_{0.25}Mn_{0.75}O_d$ upon ion-exchange, and $Na_{1.2}Ni_{0.25}Mn_{0.75}O_{d'}$ can be converted to $Na_{0.08}Li_{1.0}Ni_{0.25}Mn_{0.75}O_d$. The preferred stoichiometry is where y<0.2 in the ion-exchanged material, and most preferably a layered precursor is $Na_{0.9}Li_{0.3}Ni_{0.25}Mn_{0.75}O_{d'}$ with a similar layered structure to $Na_{0.7}MnO_{2+e}$ (e=about 0.05, Joint Committee on Powder Diffraction Standards (JCPDS) card #27-0751). The stoichiometry of the ion-exchanged product of precursor material $Na_{0.9}Li_{0.3}Ni_{0.25}Mn_{0.75}O_{d'}$ follows the definition for the composition for $Na_yLi_xNi_zMn_{(1-z-z')}M_zO_d$.

Figure 3:
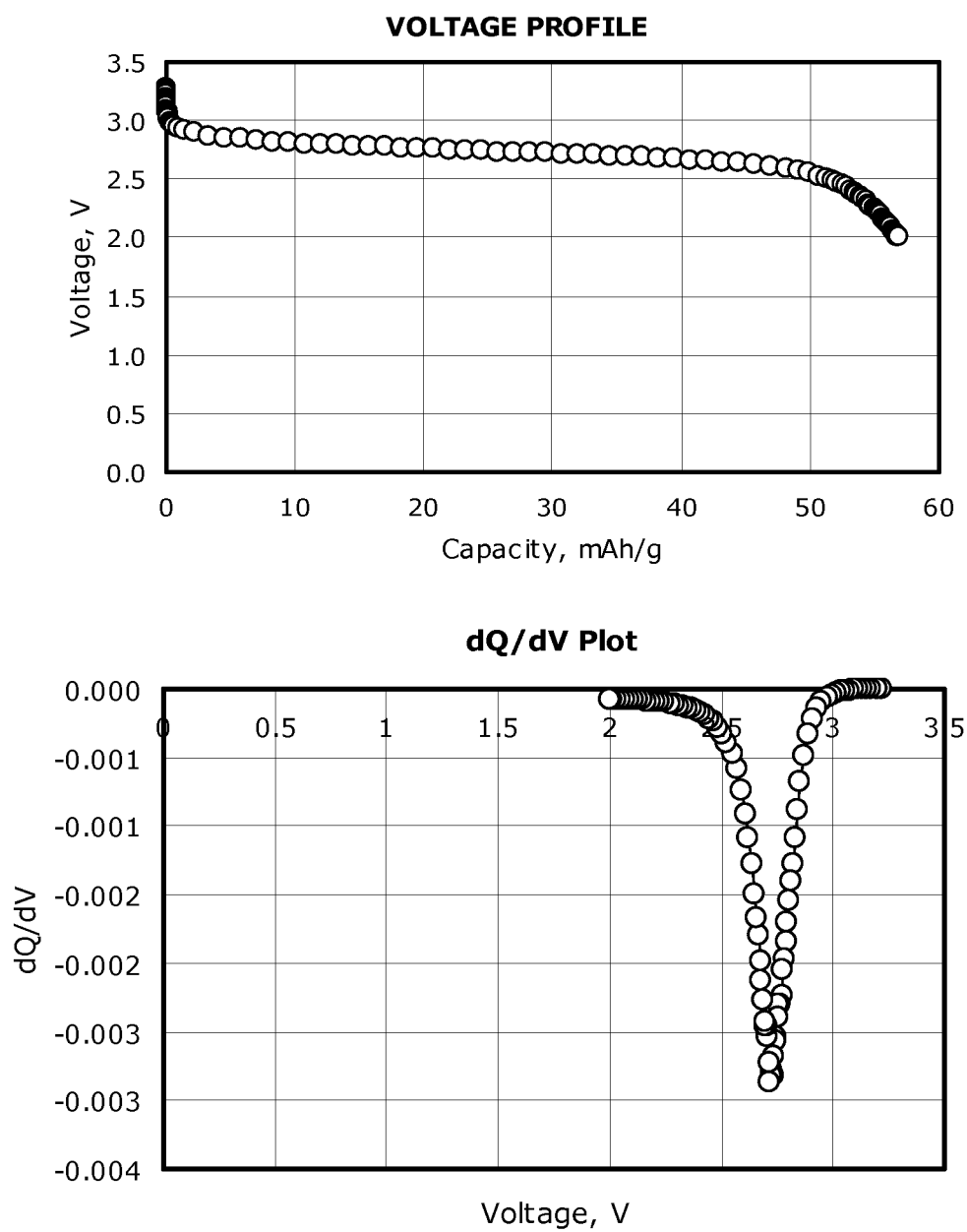
FIG. 3 depicts (a) the first discharge curve of Li/$Na_yLi_xNi_{0.25}Mn_{0.75}O_d$ cell from the sample (d) in FIG. 2, (b) the dQ/dV plot of Li/$Na_yLi_xNi_{0.25}Mn_{0.75}O_d$ cell from the sample (d) in FIG. 2.

In a preferred embodiment, the inventive material, $Na_yLi_x Ni_zMn_{(1-z-z')}M_zO_d$, has a spinel or spinel-like (disordered or defect) component as is shown in FIG. 3 for $Li/Na_{0.02}Li_{1.0}Ni_{0.25}Mn_{0.75}O_d$ cell whereby the electrochemical signature of the electrode material shows a spinel or spinel-like (disordered or defect) voltage plateau versus lithium at about 2.7 V. This spinel or spinel-like (disordered or defect) signature can be determined by a first discharge of an uncycled fresh cell of the inventive electrode material, and represents less than 50% of the total capacity of the electrode material.

Figure 4:
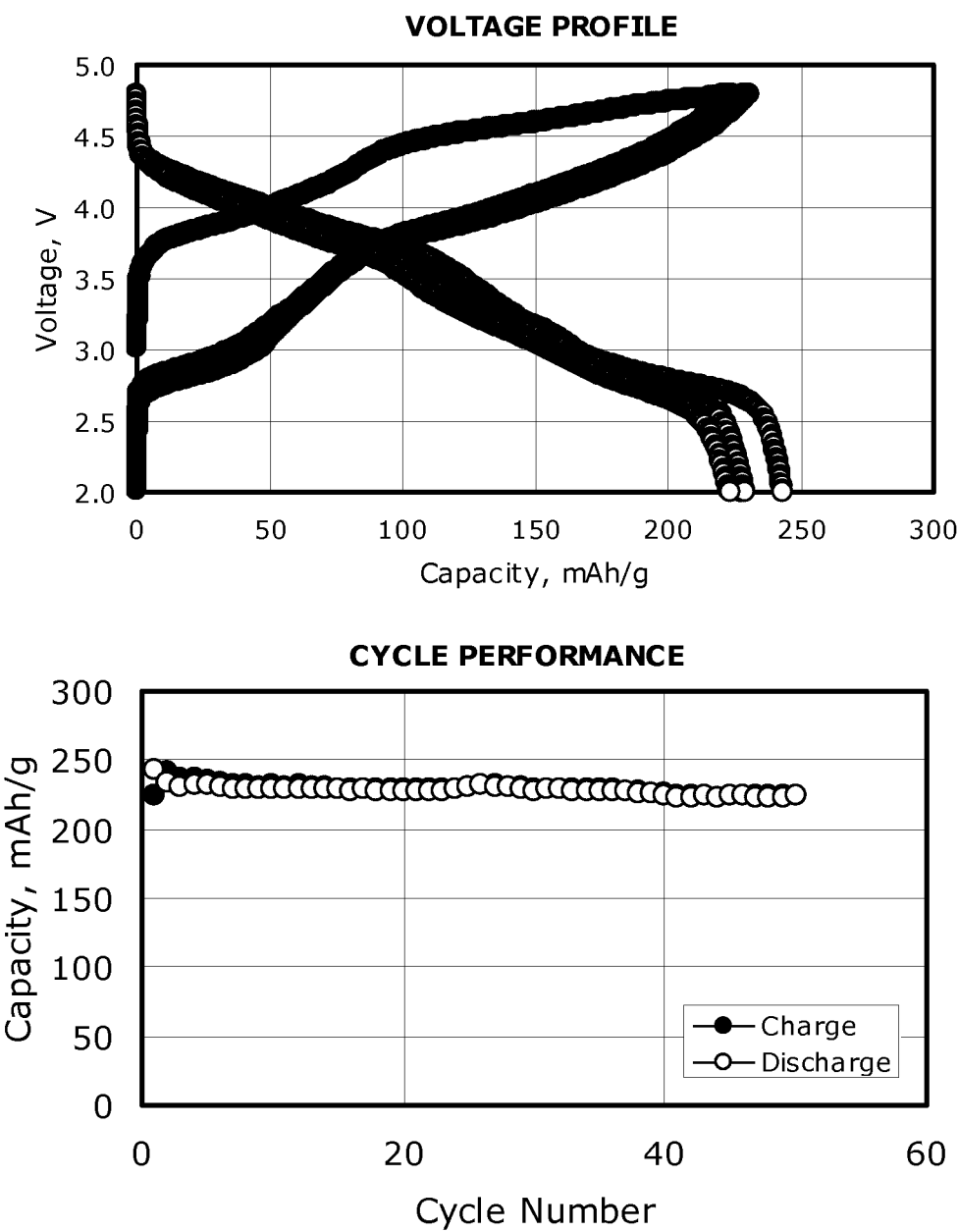
FIG. 4 depicts (a) the voltage profiles of Li/$Na_yLi_xNi_{0.25}Mn_{0.75}O_d$ cell from sample (d) in FIG. 2, 4.8 to 2.0 V at 0.5 mA/cm², (b), the capacity versus cycle number for the Li/$Na_yLi_xNi_{0.25}Mn_{0.75}O_d$ cell from sample (d) in FIG. 2.

FIG. 4 shows the voltage profiles of the (a) $Li/Na_{0.02}Li_{1.0}Ni_{0.25}Mn_{0.75}O_d$ cell, and the capacity with cycle number (b). In a preferred embodiment, the $Li/Na_{0.02}Li_{1.0}Ni_{0.25}Mn_{0.75}O_d$ cell exhibits a first charge voltage plateau at about 4.4 to 4.5 V, sloping up to 4.8 V versus Li metal. In another embodiment of the invention, the % irreversible capacity of the inventive material is preferably <10%. This is due to the presence of the spinel component adding capacity. Following the first charge, subsequent charge-discharge cycles yield a steady reversible capacity of about 210 to about 230 mAh/g.

Figure 5:
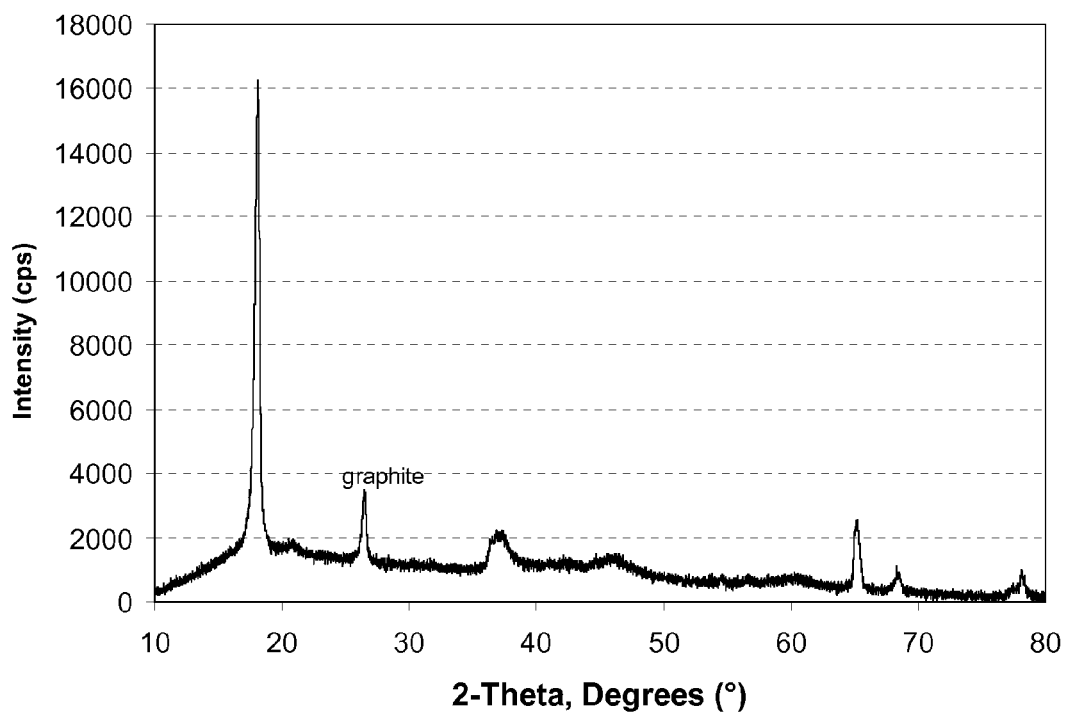
FIG. 5 depicts the XRD pattern of Li/$Na_yLi_xNi_{0.25}Mn_{0.75}O_d$ electrode from sample (d) in FIG. 2 after 50 cycles.

FIG. 5 shows the X-ray diffraction pattern of the cycled $Na_{0.02}Li_{1.0}Ni_{0.25}Mn_{0.75}O_d$ material extracted from the cell after 50 cycles. As is shown, the inventive material displays a high-intensity layering peak, even after cycling. The inventive material maintains or closely maintains its structure upon cycling to 50 cycles: the XRD pattern looks very similar to FIG. 1 (trace (d)), the material that was synthesized and loaded into the cell.

Figure 6:
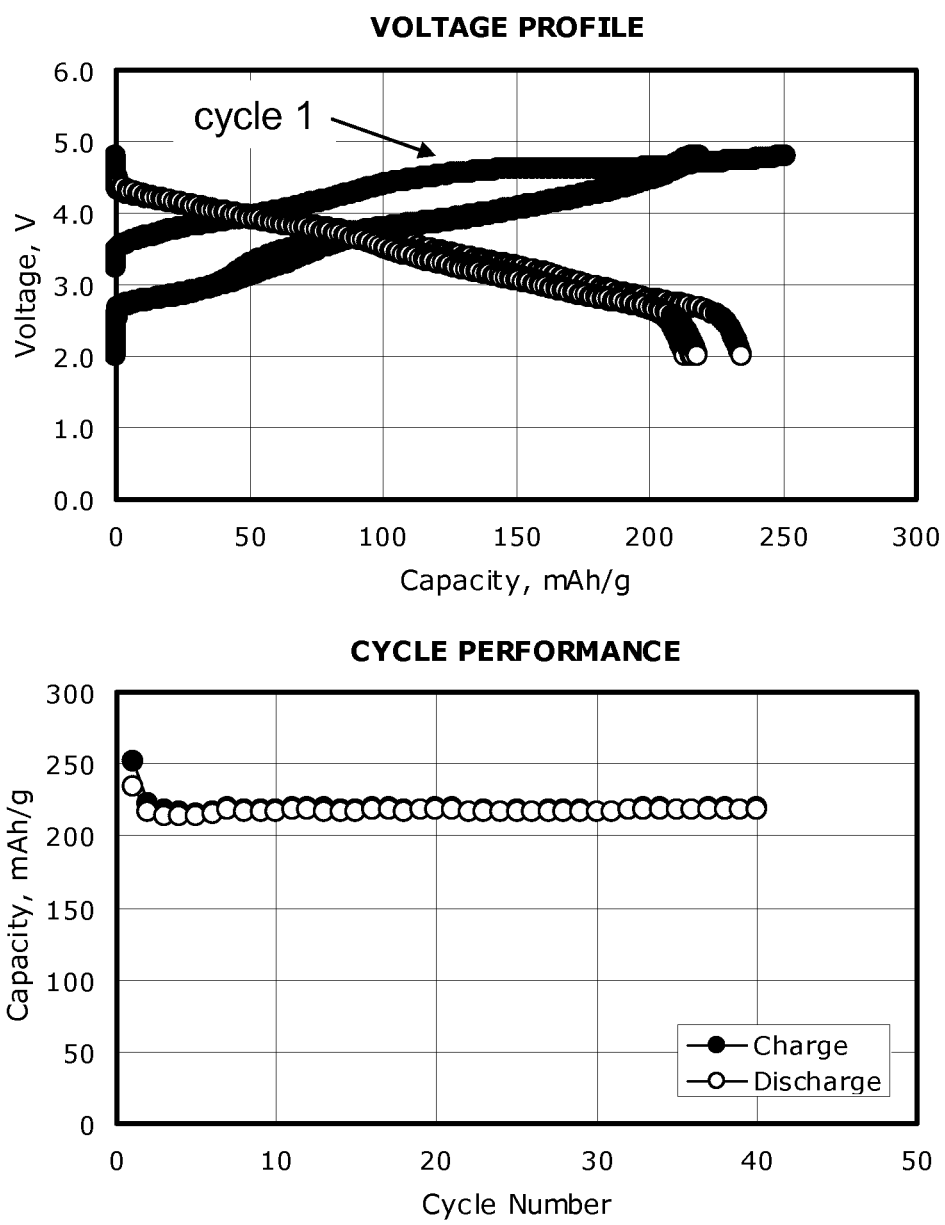
FIG. 6 depicts (a) the voltage profiles of Li/$Na_yLi_xNi_{0.25}Mn_{0.75}O_d$ cell from 4.8 to 2.0 V at 0.5 mA/cm² (15 mA/g) (b), the capacity versus cycle number for the Li/$Na_yLi_xNi_{0.25}Mn_{0.75}O_d$ cell.

FIG. 6 shows the voltage profiles and the capacity with cycle number of the inventive material that was synthesized from ion-exchange of precursor material $Na_{0.9}Li_{0.3}Ni_{0.25}Mn_{0.75}O_{d''}$.

Figure 7:
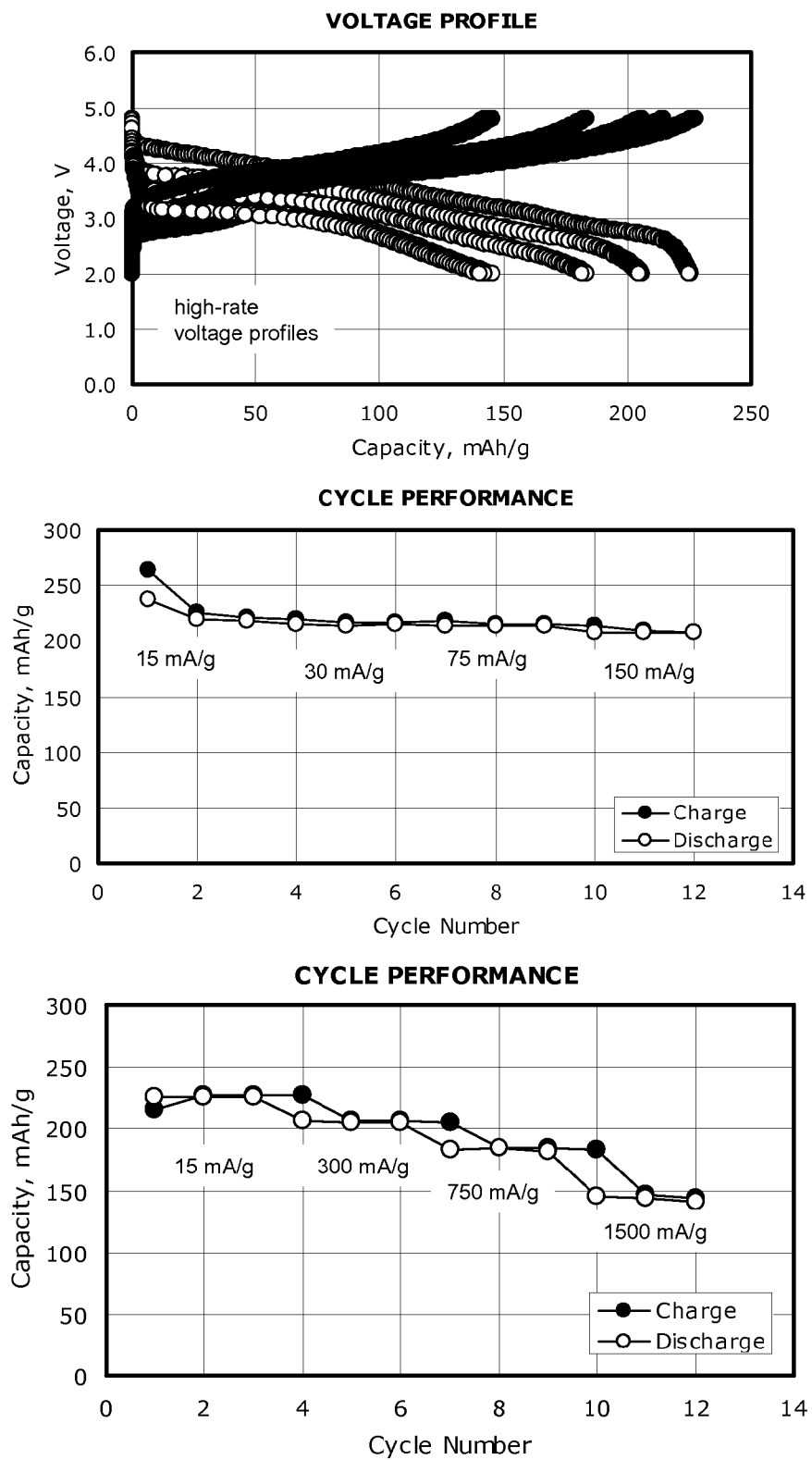
FIG. 7 depicts the (a) voltage profiles of Li/$Na_yLi_xNi_{0.25}Mn_{0.75}O_d$ cell during the high rate study tests between 4.8 and 2.0 V, (b) capacity versus cycle number part 1 (approximate current rates marked on graph, during moderate rate study), and (c) capacity versus cycle number part 2 (approximate current rates marked on graph, during high rate study).

FIG. 7 continues the voltage profiles with increasing cycling rates. In a preferred embodiment, the inventive material displays fast cycling rates.

The following examples describe the principles of the invention as contemplated by the inventors, but they are not to be construed as limiting examples.

EXAMPLE 1

The starting material layered precursor $Na_{1.0}Li_{0.2}Ni_{0.25}Mn_{0.75}O_{d'}$ was made by the reaction of about 1.37 g of $Na_2CO_3$, about 0.19 g of $Li_2CO_3$, and about 3.0 g of $Ni_{0.25}Mn_{0.75}CO_3$. The carbonates were thoroughly mixed for about 16 hours on a rotation mixer. Following rotation, the powder was lightly ground in an agate mortar and pestle for about 30 minutes. At this point, the mixed powder was placed into an alumina high-temperature vessel or tray, and placed into a box furnace. The furnace temperature was ramped to about 500° C. and held there for about 9 hours (about 4 hours ramp). The furnace was turned off and the sample was furnace-cooled. The sample was then lightly ground and returned to the furnace. The furnace was ramped to about 800° C. (ramp about 2 hours), and held there for about 8 hours. The 800° C. firing was repeated. The sample was furnace-cooled in the off mode. Scanning Electron Micrographs (SEM) of the powder were taken using a JEOL 7500 SEM instrument in the secondary electron imaging mode and an accelerating voltage of about 10 kV. The micrograph is shown in FIG. 1(a). The powder has a primary particle size of about 50 to about 500 nm and a secondary particle size of about 2 to about 20 μm with porosity.

The precursor sample also was characterized by X-ray powder diffraction (XRD) using a Siemens D5000 powder diffractometer with a scan rate of 0.6 degrees/min. The radiation was CuKα. The XRD pattern is shown in FIG. 2(a). It is similar to the Joint Committee on Powder Diffraction Standards (JCPDS) card #27-0751, which is the hexagonal $Na_{0.7}MnO_{2+e}$ (e=about 0.05) that has a layered structure.

EXAMPLE 2

Following the reaction protocol in Example 1, the precursor material $Na_{1.1}Li_{0.1}Ni_{0.25}Mn_{0.75}O_{d'}$ was made using the appropriate mole stoichiometries of $Na_2CO_3$, $Li_2CO_3$ and $Ni_{0.25}Mn_{0.75}CO_3$. The sample XRD is given in FIG. 2(b).

EXAMPLE 3

Following the reaction protocol in Example 1, the precursor material $Na_{1.2}Ni_{0.25}Mn_{0.75}O_{d'}$ was made using the appropriate mole stoichiometries of $Na_2CO_3$, and $Ni_{0.25}Mn_{0.75}CO_3$. The sample XRD is given in FIG. 2(c).

EXAMPLE 4

Following the reaction protocol in Example 1, the precursor material $Na_{0.9}Li_{0.3}Ni_{0.25}Mn_{0.75}O_{d'}$ was made using the appropriate mole stoichiometries of $Na_2CO_3$, $Li_2CO_3$, and $Ni_{0.25}Mn_{0.75}CO_3$.

EXAMPLE 5

The material synthesized in Example 1 was ion-exchanged with lithium cations using about a 2-fold excess of lithium bromide dissolved in hexanol solvent. The LiBr weighed out was about 1.6 g, and the sample weighed out was about 1.0 g. The sample and the LiBr were placed into a 250 mL round-bottom flask and then approximately 150 mL of hexanol added. The mixture was stirred and heat was applied to the round-bottom flask using a heating mantle controlled by a Variac. The round-bottom flask was connected to a water-chilled reflux condenser. The sample was heated to reflux temperature (about 160° C.) and held there under boiling conditions for about 5 hours. The heating mantle was turned off and the sample cooled to room-temperature. Following the refluxing, the powder was stirred for about 16 hours overnight at room-temperature. The sample product powder was then isolated by vacuum-filtration, and washed 5 times with clean methanol to remove sodium bromide side-product and residual hexanol. The sample was dried at room temperature for about two days. The XRD of the final powder product was taken and is shown in FIG. 2(d). There is a high-intensity layered peak and small Li—Ni—Mn ordering peaks in the range of about 20-25° 2θ (CuKα). The SEM was also measured and is shown in FIG. 1(b). The sample morphology is mostly unchanged compared to the Example 1 powder. The ICP-OES analysis using the instrument Optima 3300 Dual View ICP/OES (Perkin Elmer) yielded a stoichiometry of $Na_{0.02}Li_{1.0}Ni_{0.25}Mn_{0.75}O_d$.

EXAMPLE 6

The material synthesized in Example 2 was processed into the final product using the protocol in Example 5. The XRD of the powder is shown in FIG. 2(e). There is a high-intensity layered peak and small Li—Ni—Mn ordering peaks in the range of about 20-25° 2θ (CuKα). From ICP analysis the sample has the stoichiometry $Na_{0.04}Li_{1.24}Ni_{0.25}Mn_{0.75}O_d$.

EXAMPLE 7

The material synthesized in Example 3 was processed into the final product using the protocol in Example 5. The XRD of the powder is shown in FIG. 2(f). There is a high-intensity layered peak and small Li—Ni—Mn ordering peaks in the range of about 20-25° 2θ (CuKα). From ICP analysis the sample has the stoichiometry $Na_{0.09}Li_{1.14}Ni_{0.25}Mn_{0.75}O_d$.

EXAMPLE 8

The material synthesized in Example 4 was processed into the final product using the protocol in Example 5. From ICP analysis the sample has the stoichiometry $Na_{0.02}Li_{1.3i}Ni_{0.25}Mn_{0.75}O_d$.

EXAMPLE 9

The material synthesized in Example 5 was processed into electrode laminates. The electrode laminate was made by making slurry of 84 wt. % active material, 8 wt. % carbon and 8 wt. % PVDF binder in a NMP (N-methyl-pyrrolidinone) solvent. The slurry was cast onto an aluminum current collector sheet using a doctor blade. The wet electrode laminate was dried first at about 70-80° C. for about 4 hours in an air oven, then followed by heated vacuum drying at about 70-80° C. overnight (about 16 h). The electrode laminate was calendared. Electrodes having a size of about 9/16 inches diameter were punched out from the aluminum sheet and built into size 2032 coin cells (Hohsen). The coin cells contained lithium as counter electrode (or anode, FMC Lithium) and an electrolyte mixture comprising about 3:7 (wt., EC:EMC, Tomiyama) solvent and about 1.2 M $LiPF_6$ salt. The separator was Celgard 2325 tri-layer polypropylene. Cells were placed on a Maccor Series 2000 tester and cycled in galvanostatic mode at room-temperature between voltage limits of 4.8 to 2.0 V. Various current rates were used and are marked as such in the FIG. captions. The cell voltage profile using a first discharge is shown in FIG. 3. The cell voltage profile using a traditional first charge and subsequent cycling between voltage limits of 4.8 to 2.0 V is shown in FIG. 4(a). The capacity versus cycle number for the electrode of this Example is shown in FIG. 4(b). The XRD pattern of the electrode after 50 cycles is shown in FIG. 5. There remains a high-intensity layered peak that still resides in the inventive material sample.

EXAMPLE 10

The material synthesized in Example 8 was processed into electrode laminates and cycled as described in Example 9. Cells were placed on a Maccor Series 2000 tester and cycled in galvanostatic mode at room-temperature between voltage limits of 4.8 to 2.0 V. Various current rates were used and are marked as such in the FIG. captions. The cell voltage profile using a traditional first charge and subsequent cycling between voltage limits of 4.8 to 2.0 V is shown in FIG. 6(a). The capacity versus cycle number for the electrode of this Example is shown in FIG. 6(b). High-rate voltage profiles of this cell are shown in FIG. 7(a). The capacity versus cycle number is shown FIGS. 7(b) and 7(c), wherein the cell of the inventive material is stepped to various higher rates. Notably the capacity at the highest current rate of about 1500 mA/g yielded a specific capacity of about 150 mAh/g.

Figure 8:
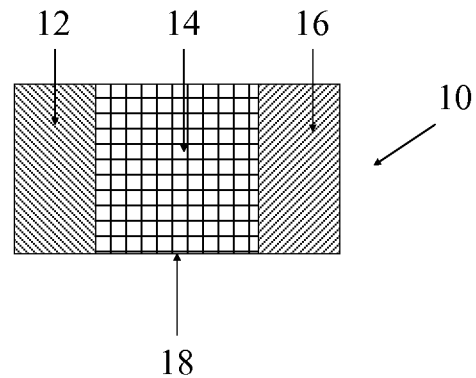
FIG. 8 depicts a schematic representation of an electrochemical cell.
Figure 9:
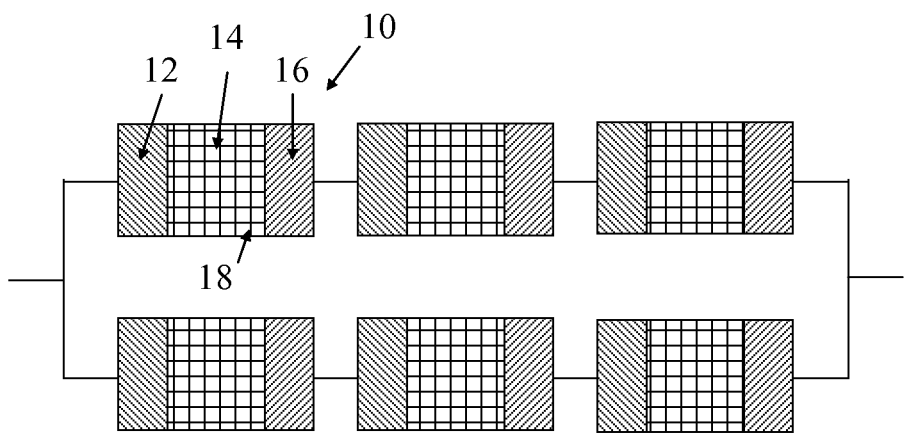
FIG. 9 depicts a schematic representation of a battery consisting of a plurality of cells connected electrically in series and in parallel.

This invention, therefore, relates to sodium/lithium-metal-oxide electrodes for non-aqueous electrochemical lithium cells and batteries, a schematic illustration of the lithium cell shown in FIG. 8, the cell being represented by the numeral 10 having a negative electrode 12 separated from a positive electrode 16 by an electrolyte 14, all contained in an insulating housing 18 with suitable terminals (not shown) being provided in electronic contact with the negative electrode 12 and the positive electrode 16. Binders and other materials normally associated with both the electrolyte and the negative and positive electrodes are well known in the art and are not described herein, but are included as is understood by those of ordinary skill in this art. FIG. 9 shows a schematic illustration of one example of a battery in which two strings of electrochemical lithium cells, described above, are arranged in parallel, each string comprising three cells arranged in series.

While there has been disclosed what is considered to be the preferred embodiments of the present invention, it is understood that various changes in the details may be made without departing from the spirit, or sacrificing any of the advantages of the present invention and that additional improvements in the capacity and stability of the electrodes can be expected to be made in the future by improving and optimizing the composition of the sodium/lithium-metal-oxide electrode structures and the processing techniques whereby the electrodes are constructed and used in electrochemical cells.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCES

1. C. S. Johnson and M. M. Thackeray, Proceedings of the International Workshop on Electrochemical Systems, The Electrochemical Society, PV 2000-36, 47-60 (2001).
2. Johnson et al., Electrochem. Commun., 6, 1085 (2004).
3. Thackeray et al., J. Mater Chem., 17, 3112 (2007).
4. Johnson et al., Electrochem. Commun., 7, 528 (2005).
5. S.-H. Park et al., Electrochem. Commun., 9, 262 (2007).
6. J. Cabana et al., J. Electrochem. Soc., 156, A730 (2009).
7. K. Kang et al., Science, 311, 977 (2006).
8. A. R. Armstrong et al., Nature, 381, 499 (1996).
9. F. Capitaine et al., Solid State Ionics, 89, 197 (1996).
10. A. D. Robertson et al., J. Mater. Chem., 13, 2367 (2003).
11. T. E. Quine et al., J. Mater. Chem., 10, 2838 (2000).
12. J. Paulsen and J. Dahn, Solid State Ionics, Vol. 126, 3 (1999).
13. Eriksson, et al., Chemistry of Materials, Vol. 15, 4456 (2003).

The embodiments of the invention in which an exclusive property or privilege is claimed are defined as follows:

1. A lithium transition metal-oxide electrode suitable for use in a lithium cell, the electrode comprising a lithium containing material of the formula $Na_yLi_xNi_zMn_{1-z-z'}M_{z'}O_d$, wherein M is a metal cation, $x+y>1$, $0<z<0.5$, $0\le z'<0.5$, $y+x+1$ is less than d, and the value of d depends on the proportions and average oxidation states of the metallic elements, Li, Na, Mn, Ni, and M, if present, such that the combined positive charge of the metallic elements is balanced by the number of oxygen anions, d; y is less than 0.2; and the lithium containing material includes a component with a spinel or spinel-like structure.

2. The electrode of claim 1 wherein M is present and is one or more metal cation selected from one or more monovalent, divalent, trivalent or tetravalent cations.

3. The electrode of claim 2 wherein M is at least one cation selected from the group consisting of $Mg^{2+}$, $Co^{2+}$, $Co^{3+}$, $B^{3+}$, $Ga^{3+}$, $Fe^{2+}$, $Fe^{3+3}$, $Al^{3+}$, and $Ti^{4+}$.

4. The electrode of claim 1 wherein M is at least one cation selected from the group consisting of $Mg^{2+}$, $Co^{2+}$, $Co^{3+}$, $B^{3+}$, $Ga^{3+}$, $Fe^{2+}$, $Fe^{3+3}$, $Al^{3+}$, and $Ti^{4+}$.

5. The electrode of claim 1 wherein $2<d\le3$.

6. The electrode of claim 1 wherein the lithium containing material comprises a component selected from the group consisting of $Na_{0.02}Li_{1.0}Ni_{0.25}Mn_{0.75}O_d$, $Na_{0.04}Li_{1.24}Ni_{0.25}Mn_{0.75}O_d$, $Na_{0.09}Li_{1.14}Ni_{0.25}Mn_{0.75}O_d$, and $Na_{0.02}Li_{1.31}Ni_{0.25}Mn_{0.75}O_d$.

7. The electrode of claim 6 wherein the lithium containing material exhibits a high-intensity layered peak and small Li—Ni—Mn ordering peaks in the range of about 20-25° 2θ (CuKα).

8. The electrode of claim 1 wherein the lithium containing material has a morphology that comprises primary globule particles having a size in the range of about 5 nm to about 500 nm, and secondary particles having a size in the range of about 2 μm to about 20 μm.

* * * * *

UNITED STATES PATENT AND TRADEMARK OFFICE
CERTIFICATE OF CORRECTION

PATENT NO.        : 8,557,438 B2
APPLICATION NO.   : 12/868470
DATED             : October 15, 2013
INVENTOR(S)       : Christopher Johnson and Sun-Ho Kang Page 1 of 1

It is certified that error appears in the above-identified patent and that said Letters Patent is hereby corrected as shown below:

IN THE CLAIMS:

Column 12, claim 3, line 19, delete "$Fe^{3+3}$" and insert --$Fe^{3+}$--;

Column 12, claim 4, line 22, delete "$Fe^{3+3}$" and insert --$Fe^{3+}$--;

Signed and Sealed this
Fourth Day of February, 2014

Michelle K. Lee
*Deputy Director of the United States Patent and Trademark Office*